United States Patent
Mansour et al.

(10) Patent No.: US 6,823,350 B1
(45) Date of Patent: Nov. 23, 2004

(54) DATABASE CLEAN-UP SYSTEM

(75) Inventors: Peter M. Mansour, Seattle, WA (US); Roman Sherman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/407,650

(22) Filed: Sep. 28, 1999

(51) Int. Cl.$^7$ .............................................. G06F 17/30
(52) U.S. Cl. ............................ 707/206; 707/1; 707/10; 707/100; 709/203
(58) Field of Search ............................ 707/1, 10, 100, 707/200; 709/203

(56) References Cited

U.S. PATENT DOCUMENTS

| | | | |
|---|---|---|---|
| 4,663,736 A | * 5/1987 | Furusawa et al. | 707/200 |
| 5,958,005 A | * 9/1999 | Thorne et al. | 709/202 |
| 6,092,101 A | * 7/2000 | Birrell et al. | 709/206 |
| 6,154,764 A | * 11/2000 | Nitta et al. | 709/200 |
| 6,216,122 B1 | * 4/2001 | Elson | 707/3 |
| 6,233,318 B1 | * 5/2001 | Picard et al. | 379/88.17 |
| 6,249,805 B1 | * 6/2001 | Fleming, III | 709/206 |
| 6,330,573 B1 | * 12/2001 | Salisbury et al. | 707/511 |
| 6,356,937 B1 | * 3/2002 | Montville et al. | 709/206 |
| 6,401,112 B1 | * 6/2002 | Boyer et al. | 709/206 |
| 6,401,239 B1 | * 6/2002 | Miron | 717/11 |
| 6,446,091 B1 | * 9/2002 | Noren et al. | 707/202 |

* cited by examiner

*Primary Examiner*—Greta Robinson
*Assistant Examiner*—Cheryl R. Lewis
(74) *Attorney, Agent, or Firm*—Merchant & Gould P.C.

(57) ABSTRACT

A clean-up system recaptures part of the memory or secondary storage space on a client device, such as a handheld personal computer. E-mail messages are organized in a hierarchy of folders within a database. Each folder may or may not contain e-mail messages. Preferably, a user downloads e-mail messages from a server to the client device. Upon placing e-mail messages into a folder, a flag set module marks the folder with a cleanup flag. The user marks any folders, messages from which he wishes to use upon disconnect from the server, for off-line use. The clean-up system parses the folder hierarchy, beginning with the first folder in the hierarchy. A clean-up module determines if the clean-up flag is set for the first folder. If the cleanup flag is set for the first folder, an off-line module determines if the folder is marked for off-line use. If the folder is marked for off-line use, the messages contained within the folder are retained for later use. If the folder is not marked for off-line use, a delete module deletes the messages contained within the folder, recapturing part of the memory or secondary storage space on the client device. This routine is repeated for each folder within the hierarchy of folders.

34 Claims, 6 Drawing Sheets

DATABASE CLEAN-UP SYSTEM

TECHNICAL FIELD

The present invention relates to personal computers and more particularly to a system running on a handheld computer, such as a Handheld PC or a Palm-size PC, for deleting unneeded data.

BACKGROUND OF THE INVENTION

Usually, a user will use a primary client device, such as a desktop personal computer, to access his e-mails contained on a server. Sometimes, the user will use a secondary client device, such as a handheld computer that is mobile, to access his e-mails. Typically, the user stores his e-mails within folders of a hierarchy of folders. While connected to the server, a Handheld PC user can download e-mails by selecting the folders into which the user wishes to download e-mails. During this process, a large number of e-mails may be downloaded by the user as the user parses all or some of the folders in the hierarchy contained on the server.

Typically, all of the e-mails that are downloaded are retained on the client device, either the primary or the secondary, even after disconnecting from the server. Retaining all of the downloaded e-mails after disconnection from the server uses up valuable storage space. This is particularly a problem when the e-mails are downloaded to a handheld computer because memory and secondary storage space is limited in handheld computers.

SUMMARY OF THE INVENTION

In one aspect of the present invention, a method of selectively deleting messages contained within folders in a database on a client device is disclosed. The folders are arranged in a true hierarchical structure. The method includes marking folders containing messages to be retained with a first flag; marking folders having messages to be deleted with a second flag; and deleting messages contained within the folders having the second flag marked and the first flag unmarked.

In another aspect of the present invention, a computer program storage medium readable by a computing system and encoding a computer program of instructions for executing a computer process for selectively deleting messages contained within folders in a database on a client device is disclosed. The folders are arranged in a true hierarchical structure. The computer process includes indicating folders containing messages to be retained with an off-line flag; indicating folders including messages to be deleted with a cleanup flag; and deleting messages contained within the folders having the cleanup flag marked and the off-line flag unmarked.

In another aspect of the present invention, a computer data signal embodied in a carrier wave readable by a computing system and encoding a computer program of instructions for executing a computer process for selectively deleting messages contained within folders in a database on a client device is disclosed. The folders are arranged in a true hierarchical structure. The computer process is analogous to that described above for the computer storage medium.

Another aspect of the present invention includes an apparatus for selectively deleting messages contained within folders in a database on a client device. The folders are arranged in a hierarchical structure. The apparatus includes an off-line module, a set module, and an erase module. The off-line module marks folders containing messages to be retained for off-line use. The set module marks folders having messages to be deleted with a cleanup flag. The erase module deletes messages contained within the folders having the cleanup flag marked and the off-line flag unmarked.

A more complete appreciation of the present invention and its scope may be obtained from the accompanying drawings, which are briefly described below, from the following detailed descriptions of presently preferred embodiments of the invention and from the appended claims.

DETAILED DESCRIPTION OF THE INVENTION

In general, the present disclosure describes a clean-up system for recapturing part of memory or secondary storage space on a personal computer. The present disclosure has been found to be particularly advantageous for recapturing memory or secondary storage space on handheld computers where memory and secondary storage space are limited. In particular, the clean-up system involves searching for folders within a hierarchy of folders for those folders that are marked with a clean-up flag and not marked for off-line use. If a folder is marked with a clean-up flag and is not marked for off-line use, the clean-up system deletes the data, for example, e-mail messages, contained within that folder.

Figure 1:
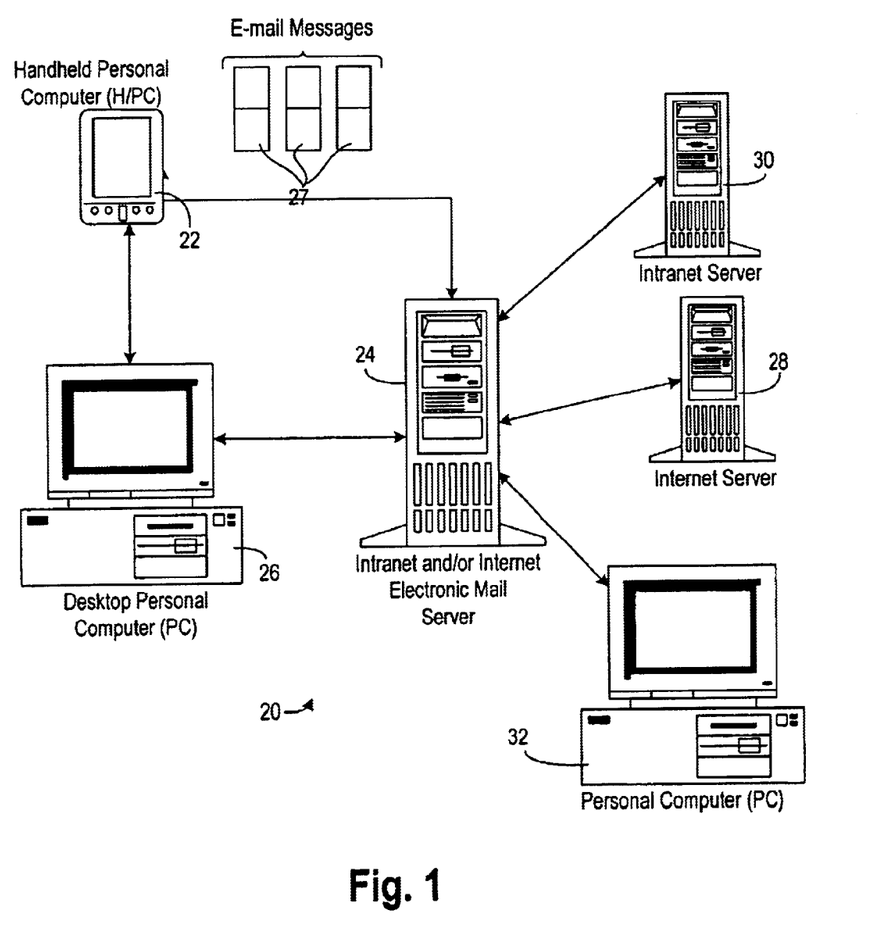
FIG. 1 is a schematic representation of a client/server computer network incorporating an e-mail server computer connected to a handheld client computer, according to the present disclosure.

FIG. 1 is schematic representation of a client/server computer network exemplary of the environment for the present invention. A client/server network system 20, including a client computing system 22, such as a handheld personal computer, is connected to a server computing system 24, such as an Intranet or Internet Electronic Mail Server. The client computing system 22 preferably includes an operating system capable of carrying out the operations of the present disclosure.

The handheld personal computer 22 is also connectable to a computing system 26, such as a desktop personal computer, as a companion device, wherein the desktop personal computer 26 connects to the server 24. The server 24 sends and receives electronic items such as electronic mail messages (e-mail) 27 through various connections or gateways to other computing systems, such as an Internet server 28, an Intranet server 30, or another desktop personal computer 32. The server 24 receives e-mail messages from the other computing systems 28, 30, and 32 and stores the e-mail messages for the user of the handheld personal computer 22 and the desktop personal computer 26 in an account dedicated to that user. Typically, the user uses the desktop personal computer 26 as the primary client device and the handheld personal computer 22 as the secondary client device.

The e-mail server 24 communicates with the various computers 22, 26, 28, 30, and 32 using specific protocols, i.e., rules governing the type and form of communications. For example, the e-mail server 24 may communicate with the handheld personal computer 22 using either a Post Office Protocol (POP) or an Internet Message Access Protocol (IMAP) or some other protocol.

The handheld personal computer 22 has software that selectively retrieves server-based items, such as the e-mail messages 27, based on predetermined criteria. For example, a user of the handheld personal computer 22 selects a folder in a hierarchy of folders to download the e-mail messages 27 for that folder from the server 24.

Figure 2:
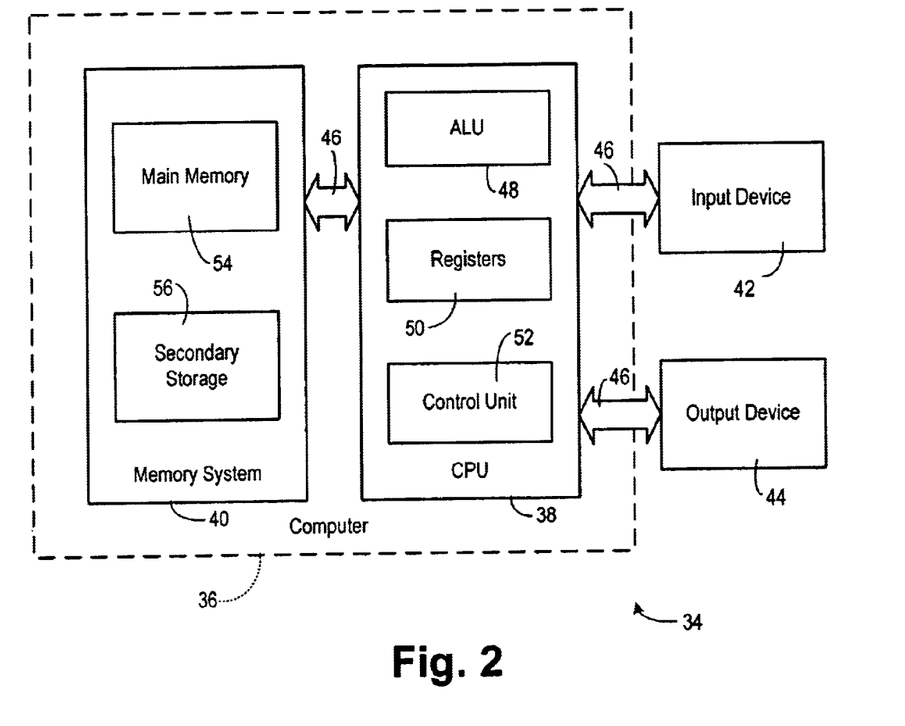
FIG. 2 is a schematic representation showing the handheld computer system of FIG. 1 that may be used to implement aspects of the present disclosure.

FIG. 2 and the following discussion are intended to provide a brief general description of a suitable computing environment in which the invention may be implemented. Although not required, the invention is described in the general context of computer executable instructions of programs being executed by a handheld computer.

The handheld personal computer 22, FIG. 1, incorporates a system 34 of resources, for implementing an embodiment of the invention, as shown in FIG. 2. The system 34 incorporates a computing system 36 having at least one central processing unit (CPU) 38, and a memory system 40. The memory system 40, an input device 42, and an output device 44 are coupled to the CPU 38 by at least one system bus 46.

The CPU 38 is of conventional design and includes an Arithmetic Logic Unit (ALU) 48 for performing computations, a collection of registers 50 for temporary storage of data and instructions, and a control unit 52 for controlling operation of the system 34. The CPU 38 may be a microprocessor having any of a variety of architectures including, but not limited, to those architectures currently produced by Intel, Cyrix, AMD, IBM, and Motorola.

The memory system 40 includes a main memory 54, in the form of media such as random access memory (RAM), including a cache, and read only memory (ROM), and may incorporate a secondary storage 56 in the form of long term storage mediums such as hard disks, floppy disks, tapes, compact disks (CDs), digital video disks (DVDs), flash memory, and the like and other devices that store data using electrical, magnetic, optical, or other recording media. The main memory 54 may also include video display memory for displaying images through the output device 44, such as a display device, i.e., a monitor. The memory 40 can include a variety of alternative components having a variety of storage capacities, such as magnetic cassettes, memory cards, digital video disks, Bernoulli cartridges, random access memories, read only memories, and the like. Memory devices within the memory system 40 and their associated computer readable media provide non-volatile storage of computer readable instructions, data structures, programs, and other data for the computing system 34.

The system bus 46 may be any of several types of bus structures such as a memory bus, a peripheral bus, or a local bus using any of a variety of bus architectures.

The input device 42 can include a keyboard, a mouse, a microphone, a touch pad, a touch screen, or the like. The output device 44 can include a display, a printer, a speaker, a touch screen, or the like. Some devices, such as a network interface or a modem, can be used as input or output devices 42 or 44. The input and output devices 42, 44 are connected to the computer 36 through the system bus 46.

The computer system 34 further includes an operating system and usually one or more application programs. The operating system includes a set of programs that control the operation of the system 34, control the allocation of resources, provide a graphical user interface to the user, and may also include accessory and utility programs. An example of an operating system that can run on the handheld personal computer is the "WINDOWS CE" brand operating system that is commercially available from Microsoft Corporation. An application program is software that runs on top of the operating system software and uses computer resources made available through the operating system to perform application specific tasks desired by the user.

The logical operations of the various embodiments of the present invention are implemented as a sequence of computer implemented steps running on a computing system or as interconnected machine modules within the computing system. The implementation is a matter of choice dependent on the performance requirements of the computing system implementing the invention. Accordingly, the logical operations making up the embodiments of the present invention described herein are referred to alternatively as operations, steps, or modules.

Figure 3:
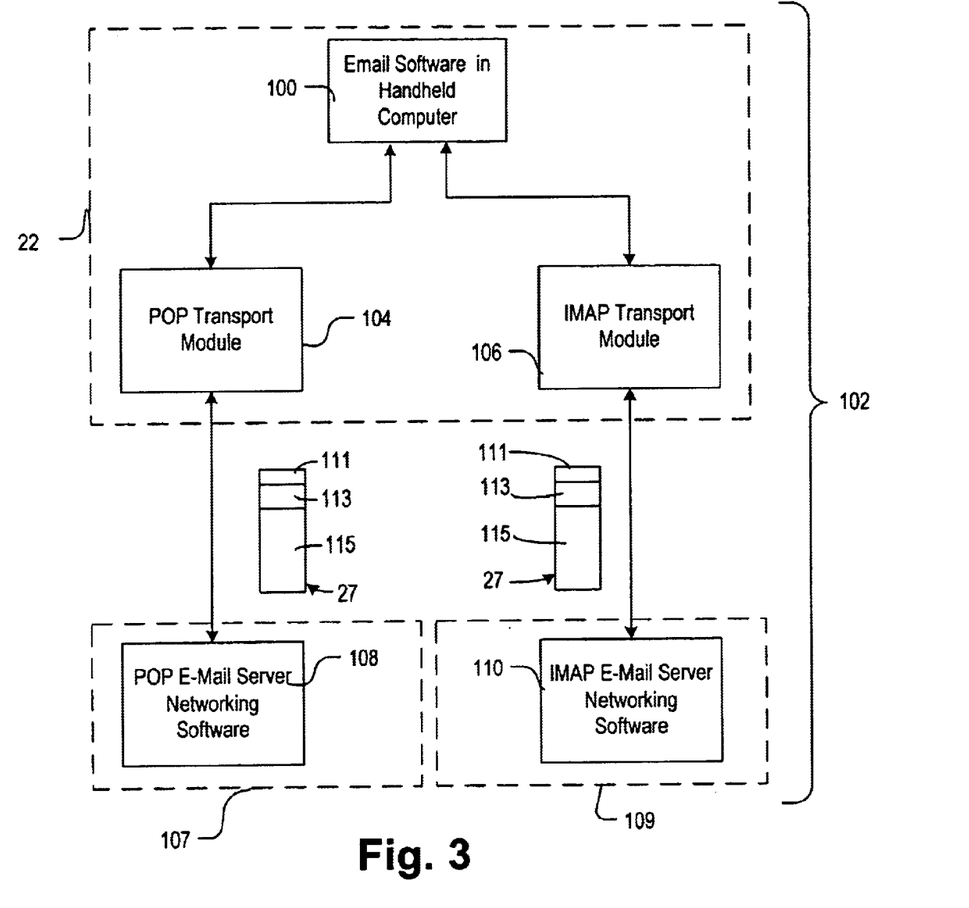
FIG. 3 is a schematic representation showing the software environment of the client/server network shown in FIG. 1; the environment including software of the present disclosure, a POP module and an IMAP module, and networking software located on the server shown in FIGS. 1 and 2.

In a preferred embodiment of the present invention illustrated in FIG. 3, the software 100 is an application program that runs on top of an operating system such as the Microsoft Windows CE operating system running on the handheld personal computer 22, FIG. 1. The e-mail software 100 works directly with communication software known as transport modules 104, 106. One module is a POP transport module 104 and another is an IMAP transport module 106. The POP transport module 104 is a network communications layer designed specifically to communicate with POP communications software 108 located on a POP e-mail server 107. The POP server 107 is a particular embodiment of the server 24 depicted in FIG. 1. Alternatively, the software 100 communicates with the IMAP transport module 106 that is a network communication layer designed to communicate with IMAP software 10 on an IMAP e-mail server 109. The IMAP server 109 is another embodiment of the server 24 depicted in FIG. 1. In alternate embodiments, other transport modules could be used.

Depending on whether the handheld personal computer 22, FIG. 1, is configured to communicate with the POP server 107 or the IMAP server 109, a transport module 104 or 106, respectively, is used. Of course, other computer configurations for other transport modules could be used. The user configures the handheld personal computer 22 to communicate based on its particular e-mail account and the protocol employed by the e-mail server 24, FIG. 1. However, with respect to the software 100, the requests, commands, and responses are the same regardless of which transport module 104 or 106 is used.

The software 100 sends command requests to the transport module 104 or 106 requesting actions be performed by the server 107 or 109. Such actions might include a command to return server based items such as e-mail messages. When a request is received by the transport module 104 or 106, the transport module 104 or 106 converts the command into data signals that are sent to the e-mail server 107 or 109 over the network connection. The e-mail server 107 or 109, and its networking software 108 or 110, receives these data signals, compiles the signals, analyzes the signals, and performs the requested operations in response to the signals. Once the e-mail server 107 or 109 performs the operations, the server 107 or 109 returns information to the transport module 104 or 106 either acknowledging the operation was completed successfully or that an error occurred.

The response from the e-mail server 107 or 109 might also include the data requested by the software 100. The response is in the form of data signals that are sent to the transport module 104 or 106, which compiles the data signals into a meaningful response and transports the response to the software 100. The software 100 is then able to parse and use the response accordingly.

The subjects of the requests from the software 100 to the e-mail server 107 or 109 relate to e-mail messages 27, FIG. 1. Each e-mail message 27 is an electronic document that is made up of at least three elements, an identification element (ID) 111, header information 113, and a message body 115. The ID 111 is used internally by the handheld personal computer 22, FIG. 1, or the server 24, FIG. 1, to identify the file and may be simple, such as an integer, or more complex, such as a file name or other ID string. The header 113 has information about the e-mail message 27, such as originator, addressee, time created, and the subject of the e-mail message 27. The header 113 may include other fields. The body 115 is the actual message created by the creator of the e-mail message 27 and may include text, graphics, other files, or attachments.

Figure 4:
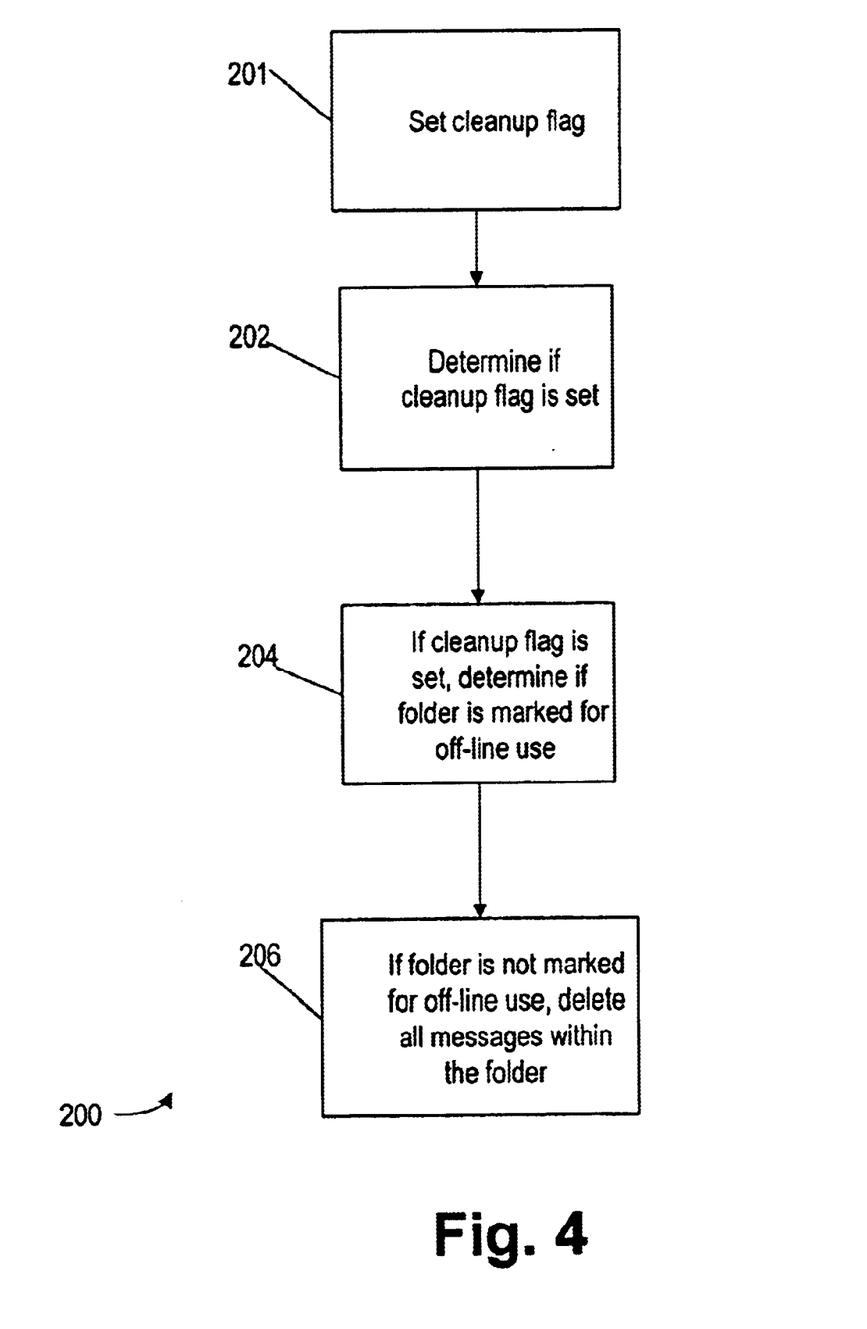
FIG. 4 is a schematic, block diagram depicting the basic functions of a clean-up system, according to the present disclosure.

FIG. 4 is a preferred embodiment of the basic operations of a clean-up system 200 according to the present invention for recapturing part of the memory or secondary storage space on a client device, such as a handheld personal computer. The e-mail messages 27, FIG. 1, are organized in a hierarchy of folders within a database. Each folder may or may not contain e-mail messages 27. Preferably, a user downloads e-mail messages 27, FIG. 1, from the server 24, FIG. 1, to the client device 22, FIG. 1, by selecting the folder into which the user wishes to download e-mail messages 27. Upon moving e-mail messages into a folder, a flag set module 201 marks the folder with a cleanup flag. The user marks any folders that he wishes to use upon disconnect from the server for off-line use.

The clean-up system 200 parses the folder hierarchy, beginning with the first folder in the hierarchy. A clean-up module 202 determines if the clean-up flag is set for the first folder. If the cleanup flag is set for the first folder, an off-line module 204 determines if the folder is marked for off-line use. If the folder is marked for off-line use, the messages contained within the folder are retained for later use. If the folder is not marked for off-line use, a delete module 206 deletes the messages contained within the folder, recapturing part of the memory or secondary storage space on the client device. This routine is repeated for each folder within the hierarchy of folders.

Figure 5:
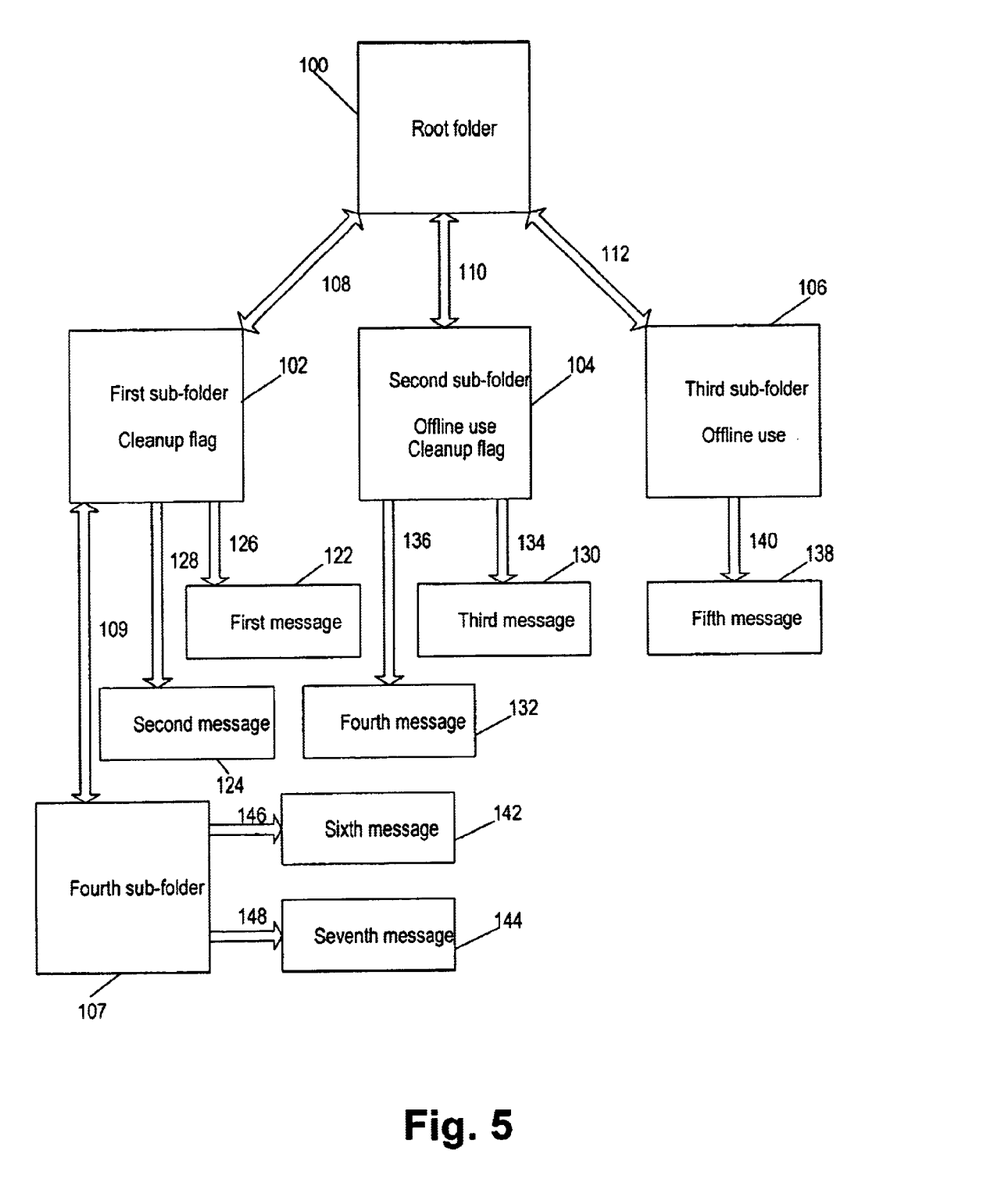
FIG. 5 is a schematic representation of a true hierarchical database, according to the present disclosure.

In general, there are two types of databases for storing e-mail messages 27: a true hierarchical database and a flat database. FIG. 5 is a schematic representation of a true hierarchical database. In a true hierarchical database, each folder of the hierarchy contains links or pointers to its sub-folders, or children, and to its root folder, or parent. In addition, each folder contains links or pointers to each message within the folder. In a true hierarchical database, finding messages contained within one folder is relatively fast because there are pointers pointing to each message contained within the folder. In contrast, parsing through all the messages in the database is relatively slow because each folder must be parsed to find the messages contained within that folder.

In a flat database the hierarchical structure is emulated. Each folder has a link to its parent but not to its children. In addition, each message has a pointer to its associated folder but the folder does not have a link to the message. In a flat database, finding messages contained within one folder is relatively slow because the folders do not have pointers to the messages; therefore, all the messages must be parsed to find the messages contained within any given folder. Finding messages associated with several folders requires parsing all the messages multiple times. In contrast, parsing through all the messages in the database is relatively fast because the messages are not contained within the folders.

Referring now to FIG. 5, a root folder 100 has first, second, and third sub-folders 102, 104, 106. A first pointer 108 links the first sub-folder 102 to the root folder 100 and the root folder 100 to the first sub-folder 102. A second pointer 110 links the second sub-folder 104 to the root folder 100 and the root folder 100 to the second sub-folder 104. A third pointer 112 links the third sub-folder 106 to the root folder 100 and the root folder 100 to the third sub-folder 106. The first sub-folder 102 has a fourth sub-folder 107. A pointer 109 links the fourth sub-folder 107 to the first sub-folder 102 and the first sub-folder 102 to the fourth sub-folder 107.

The first sub-folder 102 also contains a first message 122 and a second message 124. A fourth pointer 126 links the first sub-folder 102 to the first message 122. A fifth pointer 128 links the first sub-folder 102 to the second message 124. Likewise, the second sub-folder 104 contains third and fourth messages 130, 132 having sixth and seventh pointers 134, 136, respectively. The third sub-folder 106 has a fifth message 138 with an eighth pointer 140. The fourth sub-folder 107 has sixth and seventh messages 142, 144 with ninth and tenth pointers 146, 148, respectively.

Figure 6:
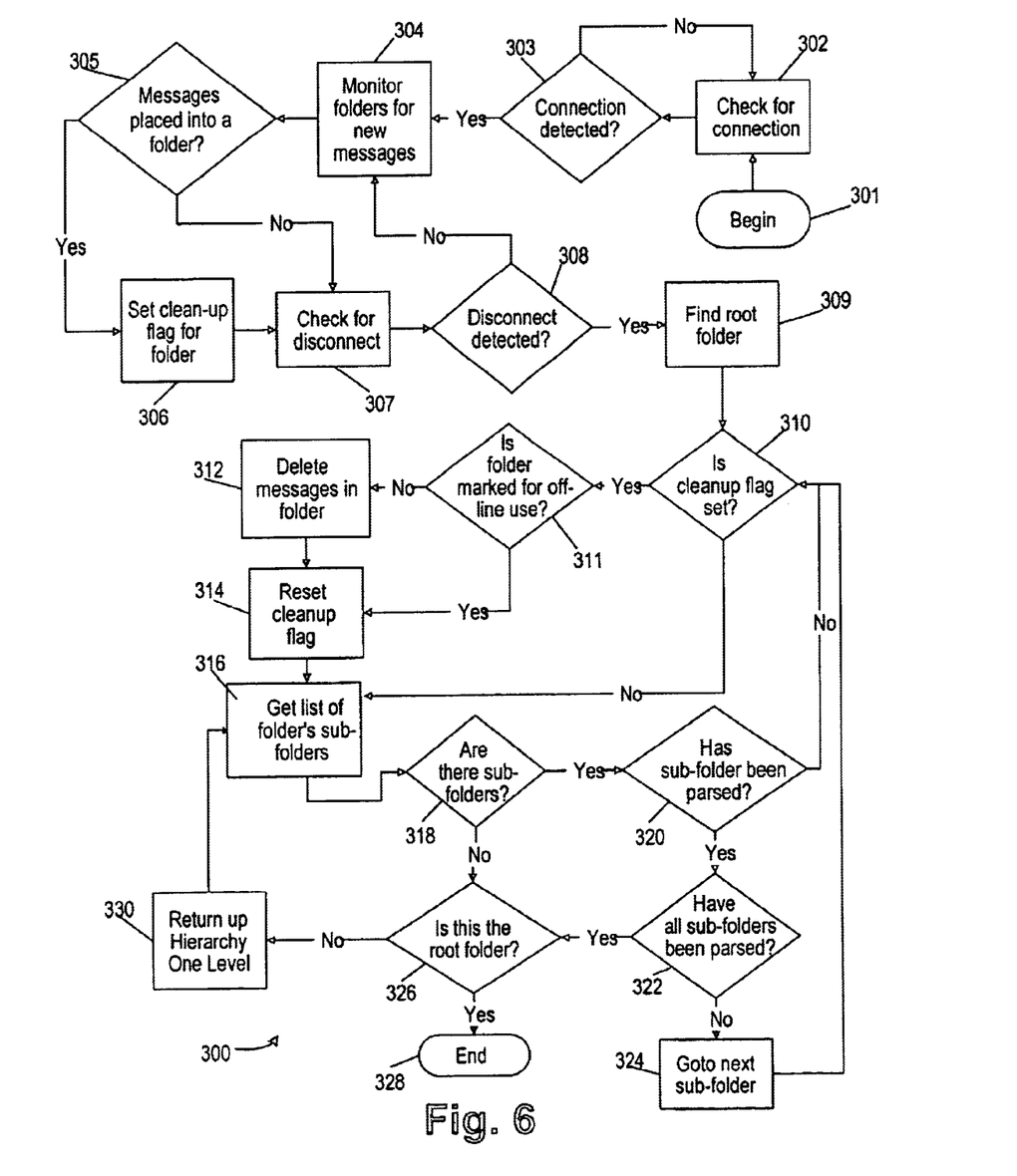
FIG. 6 is a flow chart representing logical operations of a clean-up system for recapturing part of the memory or secondary storage space of a personal computer, according to the present disclosure.

FIG. 6 is a flow chart representing logical operations of a clean-up system 300 for cleaning up or recapturing part of the memory or secondary storage space of a client device and more particularly a handheld computer using hierarchical folders. Entrance to the operational flow of the clean-up system 300 begins at a flow connection 301. A check module 302 checks for connection between the client device, such as a handheld computer, and the server. A connection detect operation 303 tests whether a connection has been detected. If the client device and the server are not communicating, the operational flow branches "NO" to the check module 302. If the client device and the server are connected, the operational flow branches "YES" to a monitor module 304.

The monitor module 304 monitors the folders of the hierarchy for messages that are placed, either by downloading or by copying or by moving, into the folders. A test operation 305 determines if any messages are placed into any of the folders. For example, to download messages from the server to a folder on the client device, the user selects the folder. The messages are then downloaded to the folder. In addition, the user might copy or move messages from one folder to another folder. If messages are placed into a folder, the operational flow branches "YES" to a set module 306. The set module 306 sets the clean-up flag for that folder. The operational flow proceeds to a check module 307. If messages have not been downloaded to a folder, the operational flow branches "NO" to the check module 307.

The check module 307 checks for a disconnect from the server. Typically, the client device is connected, as described previously, to a server. A disconnect is detected whenever the client device and the server stop communicating with each other. This may be due to disconnection from the server through normal protocols, by disconnecting a hard connection to the server, i.e., unplugging the network connection, or by some other interruption in communication between the client device and the server. A disconnect detect operation 308 tests whether a disconnect has been detected. If the client device and the server are still communicating, the operational flow branches "NO" to the monitor module 304. If the client device and the server are not connected, the operational flow branches "YES" to a find operation 309.

The find operation 309, finds the root folder of the folder hierarchy corresponding to the service to which the device was just connected. A decision module 310 detects if a clean-up flag has been set for the root folder.

If the clean-up flag is set, an off-line test module 311 detects if the folder is marked for off-line use. Preferably, the folder is marked for off-line use by the user. The user might mark any number of folders for off-line use. Marking a folder for off-line use ensures that messages in that folder will be available to the user even after the client device has been disconnected from the server. If the folder is not marked for off-line use, an erase operation 312 deletes all the messages in the folder. Thus, the user determines which folders he will use off-line, i.e. while not connected to the server, thereby causing the erase operation 312 to delete messages in the folders not marked for off-line use. By deleting unneeded messages, the clean-up system 300 is able to recapture part of the memory or secondary storage space for other uses.

It should be noted that the clean-up system 300 is activated in response to a connection between the client device and the server at the connection detection operation 303. Once the routine is completed, it does not restart until the next reconnect at the connection detection operation 303. While the user is off-line, he might copy, move, or delete messages and mark or unmark folders for off-line use. When the clean-up system 300 is activated again at the connection detection operation 303, the new criteria, i.e. the states of the "off-line use" flags on the folders, are parsed according to the operational flow chart depicted in FIG. 6.

A reset module 314 resets, or turns off, the clean-up flag. Referring back to the off-line test module 311, if the folder is marked for off-line use, the operational flow proceeds directly to the reset module 314 and resets the clean-up flag. If the folder is marked for off-line use, the user wishes to retain the messages contained within that folder while off-line. Therefore, the system bypasses the erase operation 312 and resets the clean-up flag at the reset module 314. Referring back to the decision module 310, if the clean-up flag has not been set, the operational flow branches "NO" to a get list module 316.

The get list module 316 retrieves a list of the folder's sub-folders. A sub-folder test module 318 determines if the folder has any sub-folders. If there are sub-folders, a decision operation 320 detects whether the first sub-folder has been parsed. If not, the operational flow returns to the decision module 310. If the first sub-folder has been parsed, a decision operation 322 detects if all the sub-folders have been parsed. If all the sub-folders have not been parsed, a goto operation 324 goes to the next sub-folder and the operational flow returns to the decision module 310. In this fashion, the system 300 recursively parses all the folders in the hierarchy.

If all the sub-folders have been parsed, the operational flow branches "YES" from the decision operation 322 to a root test module 326. The root test module 326 determines if this is the root folder. If this is the root folder, the operational flow ends at 328. If the test module 318 determines that there are no sub-folders, operational flow proceeds to the test module 326. If the test module 326 determines that this is not the root folder, the operational flow branches "NO" to an up operation 330. The up operation 330 returns one level up the hierarchy of folders, and the operational flow proceeds to the get list module 316.

The operational flow chart depicted in FIG. 6 may best be understood in terms of an application example. Referring now to FIGS. 5 and 6, in one example embodiment, the user has the folder hierarchy depicted in FIG. 5. The folder hierarchy was described previously herein. The second sub-folder 104 and the third sub-folder 106 were marked for off-line use by the user.

The clean-up system 300 begins at the flow connection 301. The check module 302 continually checks for a connection between the client device and the server. The connection detect operation 303 determines that a connection has been established. The monitor module 304 monitors the folders in the hierarchy of FIG. 5 for any messages that are placed into the folders. During connection, the user selects the first sub-folder 102 and the first and second messages 122, 124 are downloaded into the first sub-folder 102. The test operation 305 detects the download. The set module 306 sets a clean-up flag for the first sub-folder 102. The check module 307 continually checks for a disconnection between the client device and the server. The disconnect detect operation 308 determines if there has been a disconnect.

While still connected to the server, the user moves the third and fourth messages 130, 132 from the fourth sub-folder 107 to the second sub-folder 104. Following the operational flow described above, the set module 306 sets a clean-up flag for the second sub-folder 104.

The disconnect detect operation 308 then detects a disconnection from the server. The find operation 308 finds the root folder 100. The decision module 310 determines that a clean-up flag for the root folder 100 has not been set.

The get-list module 316 retrieves the list of the sub-folders for the root folder 100. The test module 318 determines that the root folder 100 does have three sub-folders 102, 104, 106. The decision operation 320 determines that the first sub-folder 102 has not been parsed and the operational flow returns to the decision module 310. The decision module 310 detects that a clean-up flag for the first sub-folder 102 has been set. The off-line test module 311 detects that the first folder 102 is not marked for off line use. The erase operation 312 deletes the first and second messages 122, 124, recapturing the storage space occupied by the first and second messages 122, 124. Then the reset module 314 resets the clean-up flag of the first sub-folder 102.

At get-list module 316 retrieves the list of the sub-folders of the first sub-folder 102. The decision module 318 determines that the first sub-folder 102 does have a sub-folder 107. The decision operation 320 determines that the fourth sub-folder 107 has not been parsed and the flow again returns to the decision module 310. The decision module 310 determines that the fourth sub-folder 107 does not have a clean-up flag set.

The get-list module 316 retrieves the list of the sub-folders of the fourth sub-folder 107. The sub-folder test module 318 determines that the fourth sub-folder 107 does not have any sub-folders. The test module 326 determines that the fourth sub-folder 107 is not the root folder 100. The up operation 330 returns up the hierarchy one level to the first sub-folder 102.

The get-list module 316 retrieves the list of the sub-folders of the first sub-folder 102. The sub-folder test module 318 determines that the first sub-folder 102 does have a sub-folder 107. The decision operation 320 determines that the fourth sub-folder 107 has been parsed. The decision module 322 determines that all the sub-folders of the first sub-folder 102 have been parsed. The operational flow proceeds through the path from the test module 326 to the up operation 330, as previously described, where the clean-up system 300 moves up to the root folder 100.

The operational flow proceeds through the path from the get-list module 316 to the decision operation 320, as previously described. The decision operation 320 determines that the first sub-folder 102 has been parsed. The decision operation 322 determines that the second and third sub-folders 104, 106 have not been parsed. At the goto operation 324, the operational flow proceeds to the second sub-folder 104. The decision module 310 determines that the clean-up flag for the second sub-folder 104 has been set. The off-line test module 311 determines that the second sub-folder 104 is marked for off-line use. The reset module 314 resets, or turns off, the clean-up flag. The erase operation 312 is bypassed so the third and fourth messages 130, 132 are retained for use off-line.

The operational flow path from the get-list module 316 to the sub-folder test module 318 determines that the second sub-folder 104 does not have any sub-folders. The operational flow path proceeds from the test module 326 to the goto operation 324, as previously described, causing the third sub-folder 106 to be parsed beginning with the decision module 310, as previously described. The decision module 310 determines that the third sub-folder does not have a clean-up flag set. The operational flow continues as previously described until the clean-up system ends at 328.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of selectively deleting messages contained within folders in a database on a client device, the folders being arranged in a true hierarchical structure, the method comprising:

marking folders containing messages to be retained with a first flag;

marking folders having messages to be deleted with a second flag; and deleting messages contained within the folders having the second flag marked and the first flag unmarked.

2. The method according to claim 1, wherein marking folders containing messages to be retained comprises:

marking by the client device folders containing messages to be retained with the first flag.

3. The method according to claim 1, further comprising:

before marking folders having messages to be deleted, placing messages into folders, the messages being contained within individual folders.

4. The method according to claim 3, wherein marking folders having messages to be deleted, comprises:

marking folders having messages to be deleted with a second flag in response to placing messages into the folders.

5. The method according to claim 4, wherein placing messages into folders comprises downloading messages from a server to folders on the client device.

6. The method according to claim 4, further comprising:

before downloading messages from the server, connecting the client device to the server.

7. The method according to claim 4, wherein placing messages into folders comprises copying or moving messages from one folder to another folder.

8. The method according to claim 1, wherein deleting messages comprises:

deleting messages in response to disconnecting the client device from a server.

9. The method according to claim 1, further comprising:

after deleting messages, removing the second flag from the folders to unmark the folders.

10. The method according to claim 1, wherein marking folders having messages to be deleted, comprises:

marking folders having messages to be deleted with a second flag after connecting the client device to a server.

11. The method according to claim 1, further comprising:

after deleting the messages, getting a list of a folder's sub-folders to recursively parse all the folders in the hierarchy.

12. A computer program storage medium readable by a computing system and encoding a computer program of instructions for executing a computer process for selectively deleting messages contained within folders in a database on a client device, the folders being arranged in true hierarchical structure, the computer process comprising:

indicating folders containing messages to be retained with an off-line flag;

indicating folders including messages to be deleted with a cleanup flag; and deleting messages contained within the folders having the cleanup flag marked and the off-line flag unmarked.

13. The computer storage medium of claim 12 wherein the computer process further comprises:

before marking folders having messages to be deleted, placing messages into folders, the messages being contained within individual folders.

14. The computer storage medium of claim 13 wherein marking folders having messages to be deleted, comprises:

marking folders having messages to be deleted with a cleanup flag in response to placing messages into the folders.

15. The computer storage medium of claim 14 wherein placing messages into folders comprises:

downloading messages from a server to folders on the client device.

16. The computer storage medium of claim 14 wherein placing messages into folders comprises copying or moving messages from one folder to another folder.

17. The computer storage medium of claim 12 wherein deleting messages comprises:

deleting messages in response to disconnecting the client device from the server.

18. The computer storage medium of claim 12 wherein the computer process further comprises:

after deleting messages, removing the cleanup flag from the folders to unmark the folders.

19. The computer storage medium of claim 12 wherein the computer process further comprises:

after deleting messages, getting a list of a folder's sub-folders to recursively parse all the folders in the hierarchy.

20. An apparatus for selectively deleting messages contained within folders in a database on a client device, the folders being arranged in a true hierarchical structure, the apparatus comprising:

an off-line module marking folders containing messages to be retained for off-line use;

a set module marking folders having messages to be deleted with a cleanup flag; and an erase module deleting messages contained within the folders having the cleanup flag marked and the off-line flag unmarked.

21. An apparatus according to claim 20, wherein the off-line module is under user control.

22. An apparatus according to claim 20, further comprising:

a move module placing messages into folders, the messages being contained within individual folders.

23. An apparatus according to claim 22, wherein the move module downloads messages from a server to the client device and moves or copies messages from one folder to another folder.

24. An apparatus according to claim 20, further comprising:

a connection module connecting the client device to a server.

25. An apparatus according to claim 20, further comprising:

a disconnection module disconnecting the client device from a server.

26. An apparatus according to claim 20, further comprising:

a get-list module getting a list of a folders sub-folders to recursively parse all the folders in the hierarchy.

27. A computer data signal embodied in a carrier wave readable by a computing system and encoding a computer program of instructions for executing a computer process for selectively deleting messages contained within folders in a database on a client device, the folders being arranged in a true hierarchical structure, the computer process comprising:

indicating folders in the hierarchy containing messages to be retained with an off-line flag;

indicating folders in the hierarchy having messages to be deleted with a cleanup flag; and deleting messages contained within the folders in the hierarchy having the cleanup flag marked and the off-line flag unmarked.

28. The computer data signal of claim 27 wherein the computer process further comprises:

before marking folders having messages to be deleted, placing messages into folders, the messages being contained within individual folders.

29. The computer data signal of claim 28 wherein marking folders having messages to be deleted, comprises:

marking folders having messages to be deleted with a cleanup flag in response to placing messages into the folders.

30. The computer data signal of claim 29 wherein placing messages into folders comprises:

downloading messages from a server to folders on the client device.

31. The computer data signal of claim 29 wherein placing messages into folders comprises copying or moving messages from one folder to another.

32. The computer data signal of claim 27 wherein deleting messages comprises:

deleting messages in response to disconnecting the client device from the server.

33. The computer data signal of claim 27 wherein the computer process further comprises:

after deleting messages, removing the cleanup flag from the folders to unmark the folders.

34. The computer data signal of claim 27 wherein the computer process further comprises:

after deleting messages, getting a list of a folder's sub-folders to recursively parse all the folders in the hierarchy.

\* \* \* \* \*